United States Patent
Liu et al.

(10) Patent No.: US 12,267,785 B2
(45) Date of Patent: Apr. 1, 2025

(54) PRE-EMPTIVE SUPPRESSION OF INTER-CELL INTERFERENCE IN CELLULAR WIRELESS COMMUNICATION NETWORKS

(71) Applicant: TELEFONAKTIEBOLAGET LM ERICSSON (PUBL), Stockholm (SE)

(72) Inventors: Chunhui Liu, Beijing (CN); Qi Zhang, Beijing (CN); Yuan Dong, Beijing (CN)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 360 days.

(21) Appl. No.: 17/772,254

(22) PCT Filed: Jan. 22, 2020

(86) PCT No.: PCT/IB2020/050499
§ 371 (c)(1),
(2) Date: Apr. 27, 2022

(87) PCT Pub. No.: WO2021/090074
PCT Pub. Date: May 14, 2021

(65) Prior Publication Data
US 2022/0386241 A1 Dec. 1, 2022

(30) Foreign Application Priority Data
Nov. 5, 2019 (WO) ............... PCT/CN2019/115588

(51) Int. Cl.
*H04W 52/14* (2009.01)
*H04W 52/26* (2009.01)
(Continued)

(52) U.S. Cl.
CPC ....... *H04W 52/143* (2013.01); *H04W 52/262* (2013.01); *H04W 52/267* (2013.01); *H04W 72/0473* (2013.01); *H04W 72/23* (2023.01)

(58) Field of Classification Search
CPC .. H04L 5/003; H04W 52/143; H04W 52/262; H04W 52/267; H04W 72/04;
(Continued)

(56) References Cited

U.S. PATENT DOCUMENTS 7,433,460 B2 * 10/2008 Budka ................... H04L 1/0003
455/452.2
8,254,947 B2 * 8/2012 Caretti ................... H04W 16/22
455/446
(Continued)

FOREIGN PATENT DOCUMENTS

CN 101282161 A 10/2008
CN 101754346 A 6/2010
(Continued)

OTHER PUBLICATIONS

LG Electronics Inc., Bilal Al-Doori and Xian Liu, A New Approach in LTE—A Downlink Power and Transport Block Management, Jan. 11, 2017.

*Primary Examiner* — Alpus Hsu
(74) *Attorney, Agent, or Firm* — Weisberg I.P. Law. P.A.

(57) ABSTRACT

Embodiments of a method in an access node of a wireless communication network pre-emptively reduces intercell interference, ICI, in neighboring cells. The access node is configured to transmit downlink traffic to a plurality of user equipments, UEs, in a coverage area of the access node. At least one unscheduled physical resource block, PRB, is detected. Downlink traffic across is diluted across the at least one unscheduled PRB. Finally, transmission power of scheduled PRBs is reduced.

4 Claims, 8 Drawing Sheets

(51) Int. Cl.
*H04W 72/04* (2023.01)
*H04W 72/044* (2023.01)
*H04W 72/23* (2023.01)

(58) Field of Classification Search
CPC ......... H04W 72/0473; H04W 72/1273; H04W 72/1289; H04W 72/23
See application file for complete search history.

(56) References Cited

U.S. PATENT DOCUMENTS

| | | |
|---|---|---|
| 8,385,488 B2 | 2/2013 | Choi |
| 9,271,301 B2* | 2/2016 | Manssour ............ H04W 72/541 |
| 9,578,650 B2* | 2/2017 | Wang .................... H04W 24/02 |
| 9,692,569 B2* | 6/2017 | Frenne ................. H04L 5/0007 |
| 9,769,808 B2* | 9/2017 | Liu ........................ H04W 8/005 |
| 2014/0219117 A1 | 8/2014 | Meshkati |
| 2015/0065108 A1* | 3/2015 | Bedekar ................ H04W 24/02 455/418 |
| 2016/0044530 A1* | 2/2016 | Cheng .................... H04L 47/11 370/235 |
| 2019/0349898 A1* | 11/2019 | Fu ....................... H04W 72/044 |
| 2020/0221488 A1* | 7/2020 | Li .......................... H04L 5/0053 |
| 2021/0377948 A1* | 12/2021 | Bedekar .................. H04L 5/003 |
| 2022/0216967 A1* | 7/2022 | Gong ................ H04L 27/26025 |

FOREIGN PATENT DOCUMENTS

| | | | |
|---|---|---|---|
| EP | 31161851 | A | 1/2017 |
| WO | 20090737443 | W | 6/2009 |
| WO | 20120797571 | W | 6/2012 |

* cited by examiner

PRE-EMPTIVE SUPPRESSION OF INTER-CELL INTERFERENCE IN CELLULAR WIRELESS COMMUNICATION NETWORKS

TECHNICAL FIELD

The present disclosure relates to cellular wireless Communication Networks, and in particular to Pre-emptive Suppression of Inter-Cell Interference in Cellular Wireless Communication Networks

BACKGROUND

In cellular wireless networks, inter-cell interference (ICI) imposes significant limitations on the performance of wireless links between access nodes and wireless devices. General characteristics of intercell interference include:
- Intra-frequency Interference between adjacent cells operating on a common frequency is more significant than the Inter-frequency interference between adjacent cells operating on respective different frequencies; and
- Intra-frequency Interference between adjacent cells operating with the same reference signal location(s) tends to be higher than between adjacent cells operating with different reference signal locations.

Strong ICI can seriously degrade cell performance by reducing the data rate that can be achieved between the host access node and wireless devices. Thus, many existing works introduce different means to mitigate or cancel ICI.

WO2012079757A1 describes a technique for assigning transceiver devices to transmission resources for inter-cell interference coordination in a heterogeneous cellular communication network. The network comprises a first cell layer having a first cell associated with a first transmission resource and a second cell layer having a second cell associated with a second transmission resource disjunctive from the first transmission resource. In a method implementation, the technique comprises performing a first selection procedure to select a first set of transceiver devices served in the first cell based on the potential of causing interference to transceiver devices served in the second cell, performing a second selection procedure to select a second set of transceiver devices served in the second cell based on the potential of being sensitive to interference from transceiver devices served in the first cell, and assigning the first set of transceiver devices to the first transmission resource and the second set of transceiver devices to the second transmission resource.

US20140219117 presents a method and an apparatus of triggering an inter cell interference coordination (ICIC) mechanism in a wireless network. For example, the disclosure presents a method for identifying a pilot pollution metric and determining when a pilot pollution condition based at least on the pilot pollution metric is satisfied. In addition, such as an example method may include triggering an ICIC mechanism when the pilot pollution condition is satisfied. As such, triggering an ICIC mechanism in a wireless network may be achieved.

WO2009073744A3 describes methods and apparatus for mitigating intercell interference in wireless communication systems utilizing substantially the same operating frequency band across multiple neighboring coverage areas. The operating frequency band may be shared across multiple neighboring or otherwise adjacent cells, such as in a frequency reuse one configuration. The wireless communication system can synchronize one or more resource allocation regions or zones across the multiple base stations, and can coordinate a permutation type within each resource allocation zone. The base stations can coordinate a pilot configuration in each of a plurality of coordinated resource allocation regions. Subscriber stations can be assigned resources in a coordinated resource allocation region based on interference levels. A subscriber station can determine a channel estimate for each of multiple base stations in the coordinated resource allocation region to mitigate interference.

U.S. Pat. No. 8,385,488 Discloses an inter-cell interference mitigation method using a spatial covariance matrix (SCM) estimation method in a multi-input multi-output (MIMO) orthogonal frequency division multiplexing (OFDM) communication system for mitigating interference between asynchronous cells. The inter-cell interference mitigation method includes extracting a reference symbol (RS) of a received OFDM symbol and performing channel estimation, estimating an initial SCM using the RS signal and the channel estimation result, applying time-domain sinc type weighting to the initial SCM and applying an SCM, and demodulating a data symbol with mitigated inter-cell interference using the channel estimation result and the estimated SCM. By applying time-domain sinc type weighting to SCM estimation, it is possible to reduce an SCM estimation error occurring due to a spectral leakage induced by an abrupt change in a signal at a border point between an effective sub carrier zone and a guard band zone, and a simple design of a moving average filter form for a frequency domain signal can be made instead of frequency-time-frequency domain transformation using an inverse fast Fourier transform (IFFT) and fast Fourier transfer (FFT).

CN101754346B discloses an intercell interference suppression method based on channel coherence multi-subscriber dispatching, specifically comprising the following steps: first of all, determining the activated user collection in the cooperative multi-point transmission mode CoMP, performing the multi-user dispatching for the activated user collection, selecting the user collection having the least channel coherence with channel coherence dispatching standard as the final CoMP transmission user collection, and designing a block diagonal pre-coding array by the system based on the channel state information of various users in the CoMP transmission user collection to eliminate the interference between users and perform multiple base station cooperative combined transmission for the user. The method is suitable for multi-cell multi-user MIMO system, thereby giving better attention to both the system performance and the complexity, effectively inhibiting the interference between cells, improving user performance at the cell edge and enhancing the overall system capacity.

CN101282161A discloses a method for suppressing the interference of co-frequency network through scheduling. The method comprises the following steps: firstly sorting or ranking by each cell according to the latent interference state of the subscriber in the cell to other cell; and then scheduling by each cell according to the sorting and ranking of the subscriber to obtain the purposes of suppression or elimination to the co-channel interference. The method provided by the invention can effectively reduce the co-channel interference in a wireless communication system and increases the efficiency of frequency spectrum thereby further increasing the coverage and flow capacity of the system.

The methods described in WO2012079757A1, US20140219117 and WO2009073744A3 coordinate interference among cells, whereas U.S. Pat. No. 8,385,488, CN101754346B and CN101282161A employ spatial separation techniques to mitigate ICI. All of these techniques suffer a limitation, in that they employ a reactive procedure in which interference is detected, quantized, and then evaluated to implement a mitigation strategy. This implies that that inter-cell interference, and its consequential impacts on system performance, must be present before the prior art techniques can be implemented.

Techniques that overcome at least some limitations of the prior art are desired.

SUMMARY

An aspect of the present invention provides a method in an access node of a wireless communication. The access node is configured to transmit downlink traffic to a plurality of user equipments, UEs, in a coverage area of the access node. At least one unscheduled physical resource block, PRB, is detected. Downlink traffic across is diluted across the at least one unscheduled PRB. Finally, transmission power of scheduled PRBs is reduced.

In some embodiments, diluting downlink traffic across the at least one unscheduled PRB comprises: selecting (804) one UE from among the plurality of UEs; and scheduling a selected one unscheduled PRB for downlink traffic destined for the selected UE.

In some embodiments, selecting one UE from among the plurality of UEs comprises selecting a UE having a highest modulation and coding scheme, MCS, value among the plurality of UEs.

In some embodiments, reducing transmission power of scheduled PRBs comprises reducing the MCS value allocated to the selected UE.

In some embodiments, reducing the MCS value allocated to the selected UE comprises: finding a new MCS value, based at least in part on the new number of PRBs scheduled for downlink traffic destined for the selected UE, such that a change in a transport block size (TBS) for downlink traffic destined for the selected UE is minimized; and allocating the new MCS value to the selected UE.

Embodiments of an access node, communication system, and a method in a communication system are also disclosed.

BRIEF DESCRIPTION OF THE DRAWINGS

The accompanying drawing figures incorporated in and forming a part of this specification illustrate several aspects of the disclosure, and together with the description serve to explain principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

At least some of the following abbreviations and terms may be used in this disclosure.

2D Two Dimensional
3GPP Third Generation Partnership Project
5G Fifth Generation
AAS Antenna Array System
AoA Angle of Arrival
AoD Angle of Departure
ASIC Application Specific Integrated Circuit
BF Beamforming
BLER Block Error Rate
BW Beamwidth
CPU Central Processing Unit
CSI Channel State Information
dB Decibel
DCI Downlink Control Information
DFT Discrete Fourier Transform
DSP Digital Signal Processor
eNB Enhanced or Evolved Node B
FIR Finite Impulse Response
FPGA Field Programmable Gate Array
gNB New Radio Base Station
ICC Information Carrying Capacity
IIR Infinite Impulse Response
LTE Long Term Evolution
MIMO Multiple Input Multiple Output
MME Mobility Management Entity
MMSE Minimum Mean Square Error
MTC Machine Type Communication
NR New Radio
OTT Over-the-Top
PBCH Physical Broadcast Channel
PDCCH Physical Downlink Control Channel
PDSCH Physical Downlink Shared Channel
P-GW Packet Data Network Gateway
RAM Random Access Memory
ROM Read Only Memory
RRC Radio Resource Control
RRH Remote Radio Head
SCEF Service Capability Exposure Function
SINR Signal to Interference plus Noise Ratio
TBS Transmission Block Size
UE User Equipment
ULA Uniform Linear Array
URA Uniform Rectangular Array Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB)

in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting (and/or receiving) signals to (and/or from) a radio access node. Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Cell: As used herein, a "cell" is a combination of radio resources (such as, for example, antenna port allocation, time and frequency) that a wireless device may use to exchange radio signals with a radio access node, which may be referred to as a host node or a serving node of the cell. However, it is important to note that beams may be used instead of cells, particularly with respect to 5G NR. As such, it should be appreciated that the techniques described herein are equally applicable to both cells and beams.

Note that references in this disclosure to various technical standards (such as 3GPP TS 38.211 V15.1.0 (2018-03) and 3GPP TS 38.214 V15.1.0 (2018-03), for example) should be understood to refer to the specific version(s) of such standard(s) that is (were) current at the time the present application was filed, and may also refer to applicable counterparts and successors of such versions.

The description herein focuses on a 3GPP cellular communications system and, as such, 3GPP terminology or terminology similar to 3GPP terminology is oftentimes used. However, the concepts disclosed herein are not limited to a 3GPP system.

Figure 1:
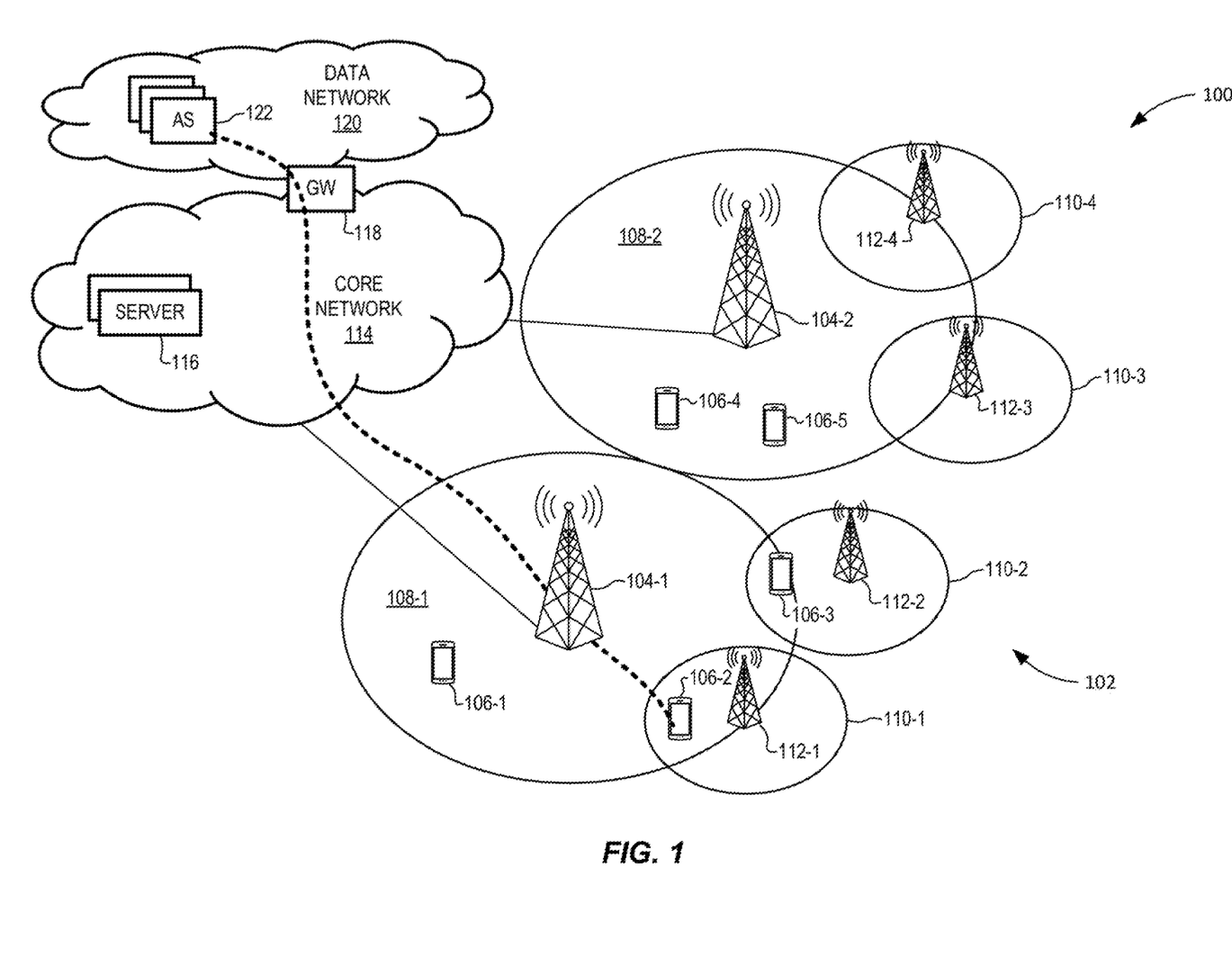
FIG. 1 is a block diagram schematically illustrating a representative network in which embodiments of the present invention may be deployed.

FIG. 1 illustrates one example of a cellular communications network 100 in which embodiments of the present disclosure may be implemented. In the embodiments described herein, the cellular communications network 100 is a Public Land Mobility Network (PLMN) conforming to one or more of the LTE, 3G, 4G and 5G NR standards, or their successors. In the illustrated example, the cellular communications network 100 includes a (Radio) Access Network ((R)AN) 102 comprising base stations 104-1 and 104-2 controlling radio communications with wireless devices 106-1, 106-2, 106-3, 106-4, 106-5 within corresponding macro cells 108-1 and 108-2. Each macro cell 108 may be defined by any suitable combination of geography, frequency, Radio Access Technology (RAT) and modulation scheme.

Base stations 104 can be any type of network access device capable of establishing radio connection(s) with one or more wireless devices 106 within a respective coverage area of the base station 104 or low power node 112, and further configured to forward subscriber traffic between the core network 114 and the one or more wireless devices 106. An important feature of a base station 104 is that it is configured with both a radio interface configured to send and receive radio signals to and from a wireless device 106, and a network interface configured to exchange electronic and/or optical signals with the core network 114. Examples of base stations 104 and low power nodes 112 include: Evolved Node B (eNB) systems (known, for example, in the 3GPP standards): Wireless Local Area Network (WLAN) access points (known, for example from IEEE 802.11 standards) or the like. In some contexts, a base station 104 may be referred to as an access point (AP) regardless of the Radio Access Technology (RAT) that it supports.

In the present disclosure, base stations 104 and low power nodes 112 may be generically referred to a radio transmitters or transmission points.

The illustrated (R)AN 102 also includes small cells 110-1 through 110-4, within which radio communication can be controlled by corresponding low power nodes 112-1 through 112-4. As with the macro cells 108, each small cell may be defined by any suitable combination of geography, frequency, Radio Access Technology (RAT) and modulation scheme. As with the base stations 104, a low power node 112 can be any type of network access device capable of establishing radio connection(s) with one or more wireless devices 106 within a respective coverage area of the low power node 112, and further configured to forward subscriber traffic between the core network 114 and the one or more wireless devices 106. An important feature of a low power node 112 is that it is configured with both a radio interface configured to send and receive radio signals to and from a wireless device 106, and a network interface configured to exchange electronic and/or optical signals with the core network 114. In some embodiments, a low power node 112 may be connected to the core network 114 by a direct connection, such as an optical cable. In other embodiments, a low power node 112 may be connected to the core network 114 by an indirect connection, such as via a radio or optical fiber link to a base station 104. Examples of low power nodes 112 include: Remote Radio Heads (RRHs) connected to a base station or a network router (not shown): WLAN access points or the like. In some contexts, a low power node 112 may be referred to as an access point (AP) regardless of the specific Radio Access Technology (RAT) that it supports.

Notably, while not illustrated, a particular small cell 110 may alternatively be controlled by a base station 104, for example using a beam-forming technique. In such cases, the particular small cell 110 will not be associated with a respective low power node 112 per se. Rather, the particular small cell 110 will be associated with a respective set of parameters implemented in the base station 104. In this disclosure, the term "cell" is used to refer to a defined combination of parameters (such as geography, frequency, Radio Access Technology (RAT), modulation scheme, identifiers and the like) that can be used by a wireless device 106 to access communication services of the network 100. The term "cell" does not imply any particular parameter values, or any particular physical configuration of devices needed to enable a wireless device 106 to access those communication services.

Wireless devices 106 can be any type of device capable of sending and receiving radio signals to and from a base station 104 and/or low power node 112. Examples of wireless device 106 include cellular phones, Personal Data Assistants (PDAs), mobile computers, Internet of Things (IoT) devices, autonomous vehicle controllers, and the like. In some contexts, a wireless device 106 may be referred to as a User Equipment (UE) or a mobile device.

In some embodiments, the macro cells 108-1 and 108-2 may overlap each other, and may also overlap one or more small cells 110. For example, a particular macro cell 108-1 may be one macro cell 108 among a plurality of macro cells covering a common geographical region and having a common RAT and modulation scheme, but using respective different frequencies and/or AP identifiers. In such cases, a wireless device 106 located within a region covered by two or more overlapping cells 108, 112 may send and receive radio signals to and from each of the corresponding base stations 104 and/or low power nodes 112.

In the illustrated example, the (R)AN 102 is connected to a Core Network (CN) 114, which may also be referred to as Evolved Core Network (ECN) or Evolved Packet Core (EPC). The CN 114 includes (or, equivalently, is connected to) one or more servers 116 configured to provide networking services such as, for example, Network Functions (NFs) described in 3GPP TS 23.501 V15.2.0 (2018-06) "System Architecture for the 5G System" and its successors. The CN 114 also includes one or more gateway (GW) nodes 118 configured to connect the CN 114 to a packet data network (DN) 120 such as, for example, the internet. A gateway node 118 may be referred to as a packet gateway (PGW) and/or a serving gateway (SGW). The DN 120 may provide communications services to support end-to-end communications between wireless devices 106 and one or more application servers (ASs) 122 configured to exchange data packet flows with the wireless devices 106 via the CN 114 and (R)AN 102. In some contexts, an application server (AS) 122 may also be referred to as a host server.

In some contexts, an end-to-end signal path between an AS 122 and one or more wireless devices 106 may be referred to as an Over-The-Top (OTT) connection. Similarly, a communication service that employs signal transmission between an AS 122 and one or more wireless devices 106 may be referred to as an OTT service.

It should be appreciated that the separation between the CN 114 and the DN 120 can be purely logical, in order to simplify understanding of their respective roles. In particular, the CN 114 is primarily focused on providing wireless device access services and supporting wireless device mobility. On the other hand, the DN 120 is primarily focused on providing end-to-end communications, particularly across network domains. However, it will be appreciated that both the CN 114 and the DN 120 can be implemented on common physical network infrastructure, if desired.

Figure 2A:
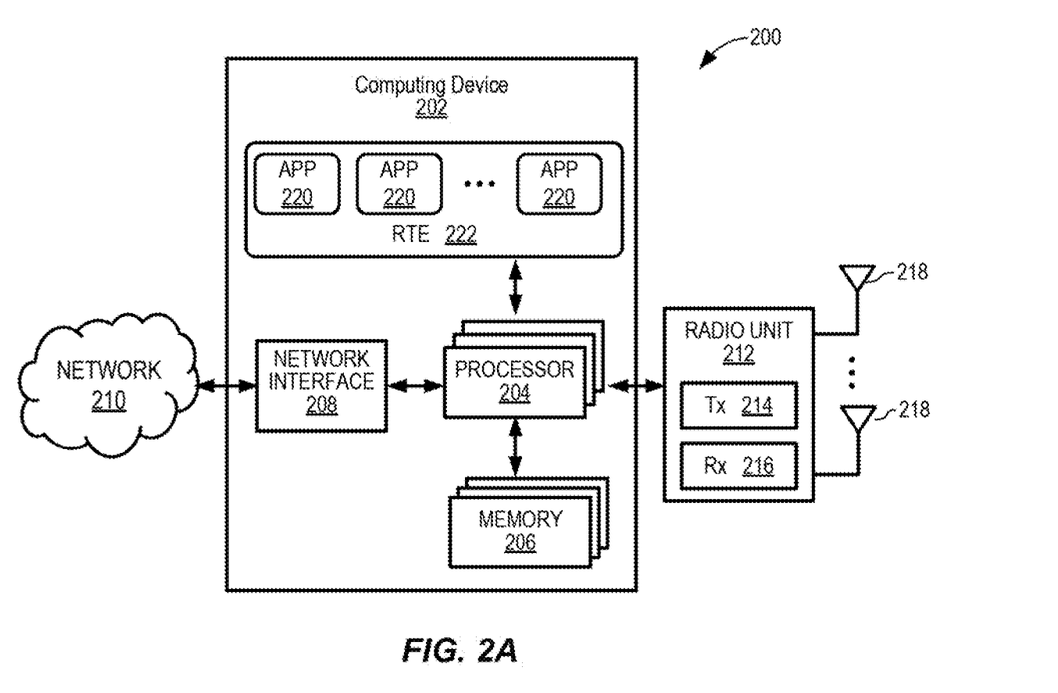
FIGS. 2A and 2B are block diagrams schematically illustrating examples of a computing device usable in embodiments of the present invention.
Figure 2B:
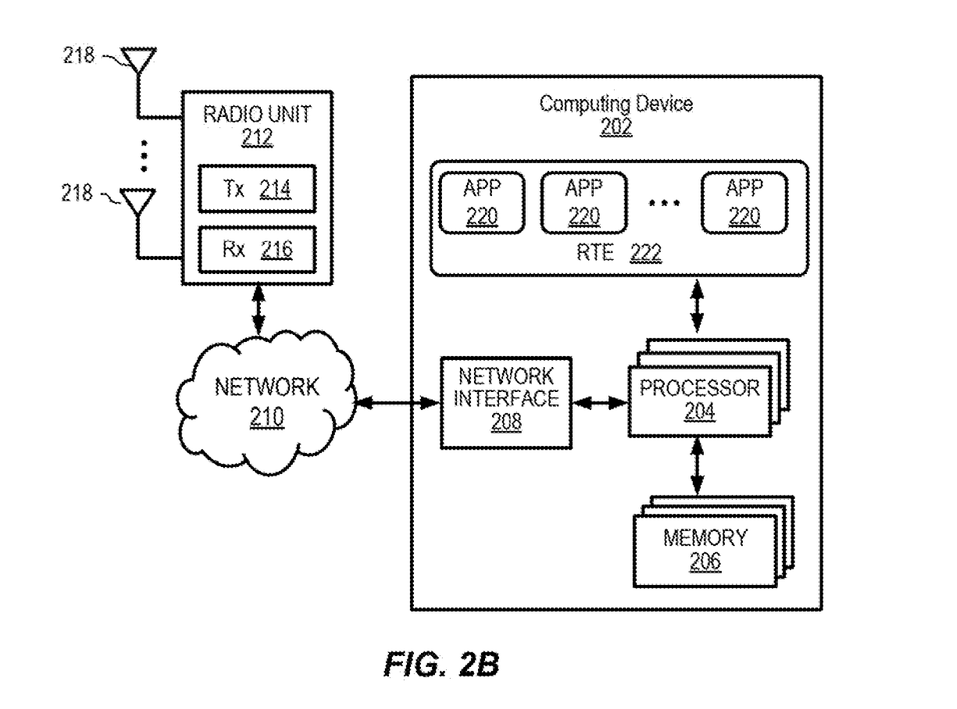

FIGS. 2A and 2B is a block diagram schematically illustrating a communications system 200 including a computing device 202 usable in embodiments of the present invention. In various embodiments, any or all of the base stations 104 or 112, wireless devices 106, core network servers 116 or gateways 118 and data network servers 122 may be implemented using systems and principles in accordance with the computing device 202. It may also be appreciated that any or all of the elements of the network 100 may be virtualized using techniques known in the art or developed in the future, in which case the functions of any or all the base stations 104 or 112, core network servers 116 or gateways 118, and/or any or all of the network functions 206-226 may be implemented by suitable software executing within a computing device 202 or within a data center (non shown) composed of multiple computing devices 202.

In the example of FIG. 2A, the communications system 200 generally includes computing device 202 connected to one or more networks 210 and one or more radio units 212. The computing device 202 includes one or more processors 204, a memory 206, one or more network interfaces 208. The processors 204 may be provided as any suitable combination of Central Processing Units (CPUs), Application Specific Integrated Circuits (ASICs), Field Programmable Gate Arrays (FPGAs), or the like. Similarly, the memory 206 may be provided as any suitable combination of Random Access Memory (RAM), Read Only Memory (ROM) and mass storage technologies such as magnetic or optical disc storage or the like. The network interfaces 208 enable signaling between the computing device 200 and the networks 210, such as the Core Network 114, the data network 120, or a private domain network such as a data center (not shown).

Each radio unit 212 typically includes at least one transmitter (Tx) 214 and at least one receiver (Rx) 216 coupled to one or more antennas 218. In the example of FIG. 2A, the radio unit(s) 212 is(are) shown as being external to the computing device 202 and connected to the computing device 202 via a suitable physical connection (such as a copper cable or an optical cable). In the example of FIG. 2B, the radio unit(s) 212 is(are) shown as being connected to computing device 202 via a network 210 and a network interface 208. In still other embodiments, the radio unit(s) 212 and optionally also the antenna(s) 218 may be integrated together with the computing device 202.

The one or more processors 204 operate to provide functions of the computing device 202. Typically, these function(s) are implemented as software applications (APPs) 220 or modules that are stored in the memory 206, for example, and executed by the one or more processors 204. In some embodiments, one or more software applications or modules 220 may execute within a secure run-time environment (RTE) 222 maintained by an operating system (not shown) of the computing device 202.

It may be appreciated that specific embodiments may exclude one or more of the elements illustrated in FIGS. 2A and 2B. For example, a computing device 202 configured to implement a wireless device 106 may incorporate one or more processors 204, a memory 206, and one or more radio units 212, but may exclude a network interface 208. Conversely, a computing device 202 configured to implement a server 116 or 122 may include one or more processors 204, a memory 206, and one or more network interfaces 208, but may exclude radio units 212. A computing device 202 configured to implement a base station 104 or 112, on the other hand, will normally include one or more processors 204, a memory 206, and both radio units 212 and network interfaces 208.

Figure 3:
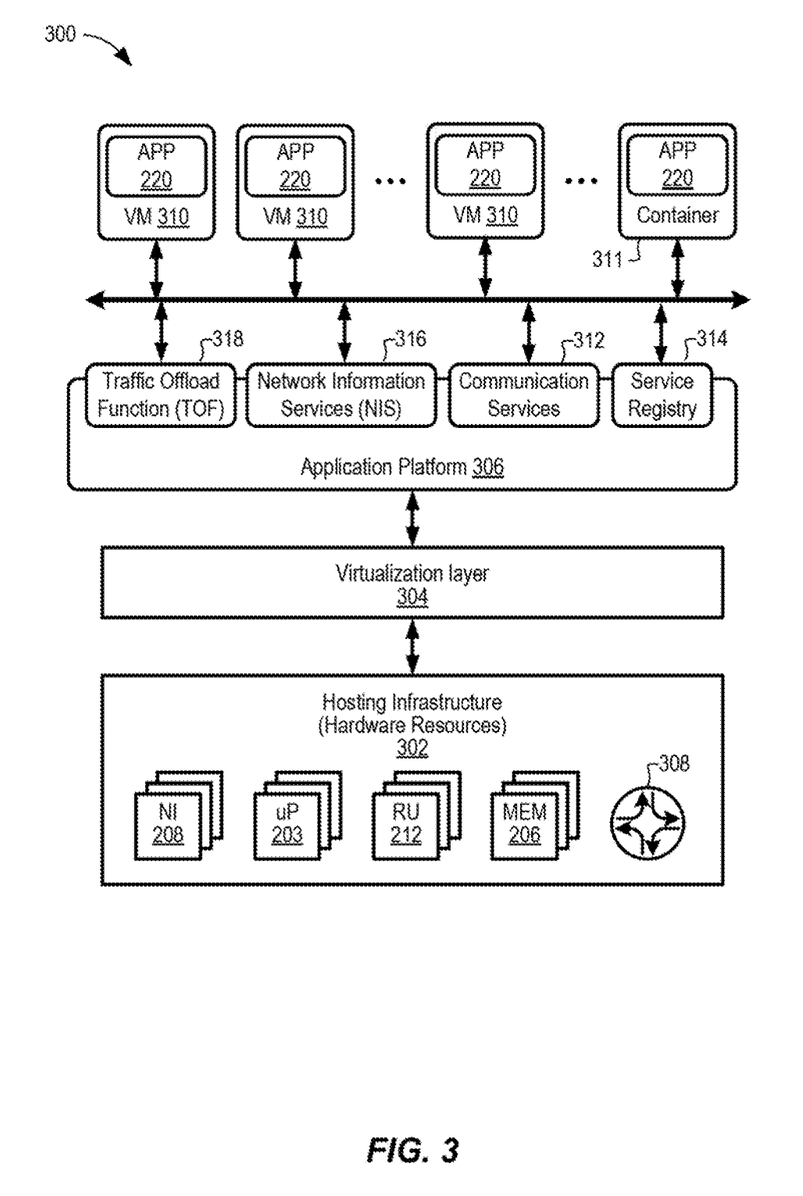
FIG. 3 is a block diagram schematically illustrating an architecture of a representative network element virtualization usable in embodiments of the present invention.

FIG. 3 is a block diagram schematically illustrating an example architecture for network element virtualization usable in embodiments of the present invention. It is contemplated that the network elements may be physically implemented using one or more computers, data storage devices and routers (any or all of which may be constructed in accordance with the system 200 described above with reference to FIG. 3) interconnected together and executing suitable software to perform its intended functions. Those of ordinary skill will recognize that there are many suitable combinations of hardware and software that may be used for this purpose, which are either known in the art or may be developed in the future. For this reason, a FIG. showing physical hardware components and connections is not included herein.

As maybe seen in FIG. 3, the illustrated architecture 300 generally comprises hosting infrastructure 302, a virtualization layer 304 and an Application Platform Services layer 306. The hosting infrastructure 302 comprises physical hardware resources provided by the infrastructure on which the architecture 300 is being implemented. These physical hardware resources may include any or all of the processors 204, memory 206, network interfaces 208 and radio units 212 described above with reference to FIG. 2, and may also include traffic forwarding and routing hardware 308. The virtualization layer 304 presents an abstraction of the hardware resources 302 to the Application Platform Services layer 306. The specific details of this abstraction will depend on the requirements of the applications 220 being hosted by the Application Platform Services layer 306. Thus, for example, an APP 220 that provides traffic forwarding functions may be presented with an abstraction of the hardware resources 306 (e.g. processor(s) 204, memory 206 and traffic forwarding hardware 308) that simplifies the implementation of traffic forwarding policies. Similarly, an application that provides data storage functions may be presented with an abstraction of the hardware resources 306 (e.g. processor(s) 204 and memory 206) that facilitates the storage and retrieval of data (for example using Lightweight Directory Access Protocol-LDAP).

The application platform 306 provides the capabilities for hosting applications. In some embodiments, the application platform 306 supports a flexible and efficient multi-tenancy run-time and hosting environment for applications 220 by providing Infrastructure as a Service (IaaS) facilities. In operation, the application platform 306 may provide a security and resource "sandbox" for each application 220 being hosted by the platform 306. Each "sandbox" may be implemented as a Virtual Machine (VM) image 310 that may include an appropriate operating system and controlled access to (virtualized) hardware resources 302. Alternatively, each "sandbox" may be implemented as a container 311 that may include appropriate virtual memory and controlled access to host operating system and (virtualized) hardware resources 302. The application platform 306 may also provide a set of middleware application services and infrastructure services to the applications 220 hosted on the application platform 306, as will be described in greater detail below.

Applications 220 from vendors, service providers, and third-parties may be deployed and executed within a respective Virtual Machine 310. For example, PCF 220 may be implemented by means of one or more applications 220 hosted on the application platform 306 as described above. Communication between applications 220 and services of the application platform 306 may conveniently be designed according to the principles of Service-Oriented Architecture (SOA) known in the art.

Communication services 312 may allow applications 220 to communicate with the application platform 306 (through pre-defined Application Programming Interfaces (APIs) for example) and with each other (for example through a service-specific API).

A Service registry 314 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Network Information Services (NIS) 316 may provide applications 220 with low-level network information pertaining to a network service instance or one or more PDU sessions, for example. For example, the information provided by NIS 316 may be used by an application 220 to calculate and present relevant data (such as: cell-ID, location of the subscriber, cell load and throughput guidance) to other network functions, any or all of which may themselves to implemented by applications 220 executing in respective VMs 310.

A Traffic Off-Load Function (TOF) service 318 may prioritize traffic, and route selected, policy-based, data streams to and from applications 220.

Figure 4:
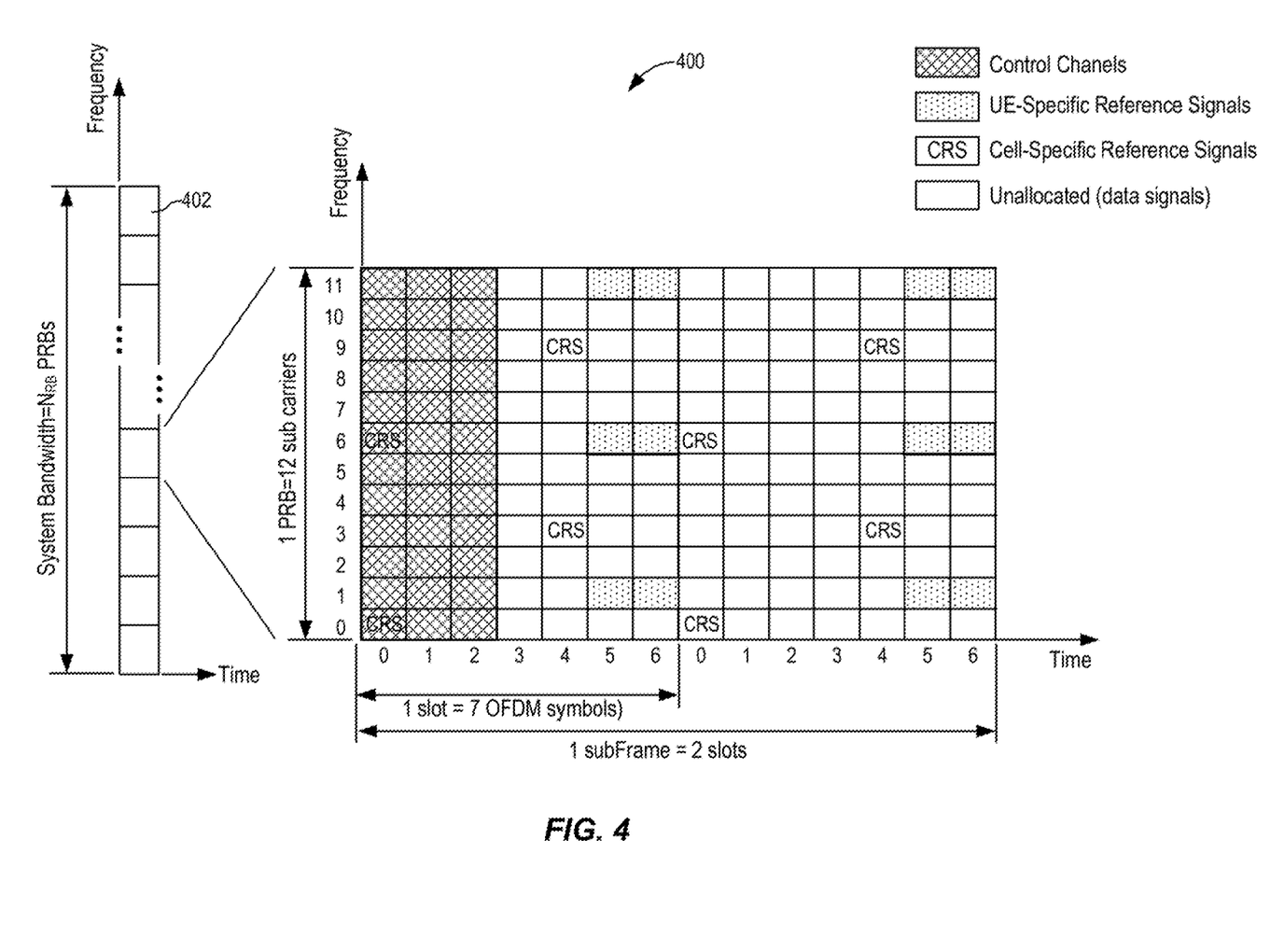
FIG. 4 is a block diagram illustrating an example resource grid usable in conjunction with embodiments of the present invention.

FIG. 4 illustrates an example resource grid 400 usable in the network of FIG. 1. The illustrated resource grid consists of a time-frequency division of radio resources that may be used for scheduling of data transmissions between radio access nodes 104, 112 and UEs 106. As may be seen in FIG. 4, the total system bandwidth is divided (in the frequency dimension) into a set of physical resource blocks (PRBs) 402. In 5G NR networks, the total system bandwidth may be into N=24 or more PRBs 402. Each physical resource block (PRB) may be further sub-divided (in the frequency dimension) into a set of sub-carriers on a defined frequency spacing. For example, a PRB 402 may be subdivided into 12 sub-carriers on a 30 kHz spacing. In the illustrated example, 7 OFDM symbols are transmitted within a slot having a defined period, such as 1 mSec. for example. Each time-frequency location within the resource grid is referred to as a resource element (RE). Two successive slots may be taken together to form a sub-frame comprising 12×14=168 REs, which can be allocated as required to enable transmission of control channel signals, synchronization signals, cell-specific reference signals, UE-specific reference signals and data signals destined for UEs.

Those skilled in the art will appreciate that wireless signals are transmitted between a radio access node 104, 112 and the wireless devices 106 using radio resources which are scheduled according to one or more scheduling algorithms. A scheduler may be provided in the radio access node 104, 112 or logically coupled to the radio access node for this purpose. As used herein, the term "radio resources" refers to any available resource or combination of available resources which can be used to transmit wireless signals, such as frequency (e.g. one or more frequency channels or sub-channels), time (e.g. one or more frames, sub-frames, slots, etc) or codes (e.g. as used for code-division multiplexing).

Thus, for downlink communications (i.e. from the radio access node 104, 112 to the wireless devices 106), a pool of available radio resources is distributed for transmissions to the wireless devices 106 according to a scheduling algorithm. Various scheduling algorithms are known in the art, and the present disclosure is not limited in that respect. Suitable examples include round robin, fair queuing, proportionally fair scheduling and maximum throughput.

Those skilled in the art will appreciate that the output power of a radio access node varies as a function of the resources it uses for transmissions. For example, when the radio access node is scheduled to transmit using a relatively large amount of resources at any one time (e.g. a relatively large number of frequencies), the output power of that radio access node will also be relatively high. Conversely, when the radio access node is scheduled to transmit using relatively few resources at any one time, the output power of that radio access node will be relatively low.

As noted above, strong ICI can seriously degrade cell performance by reducing the data rate that can be achieved between the host access node and wireless devices. Thus, many existing works introduce different means to mitigate or cancel ICI. Known prior art techniques suffer a limitation in that they employ a reactive procedure in which interference is detected, quantized, and then evaluated to implement a mitigation strategy. This implies that that inter-cell interference, and its consequential impacts on system performance, must be present before the prior art techniques can be implemented.

In modern wireless networks, it frequently occurs that PRBs are only partially scheduled for carrying data traffic, such that at least some PRBs remain unscheduled at any given time. For example, partial scheduling of PRBs can occur under any combination of the following conditions:
   The traffic demand at a given instant is not high enough to require scheduling of all PRBs;
   Lack of available physical downlink control channel (PDCCH) resources;
   Resource allocations are limited by hardware implementations, such that, for example, only a limited number of UEs can be scheduled at any given time;
   Radio Resource allocations are limited for some purpose, for example to meet radio emission regulations.

Figure 5:
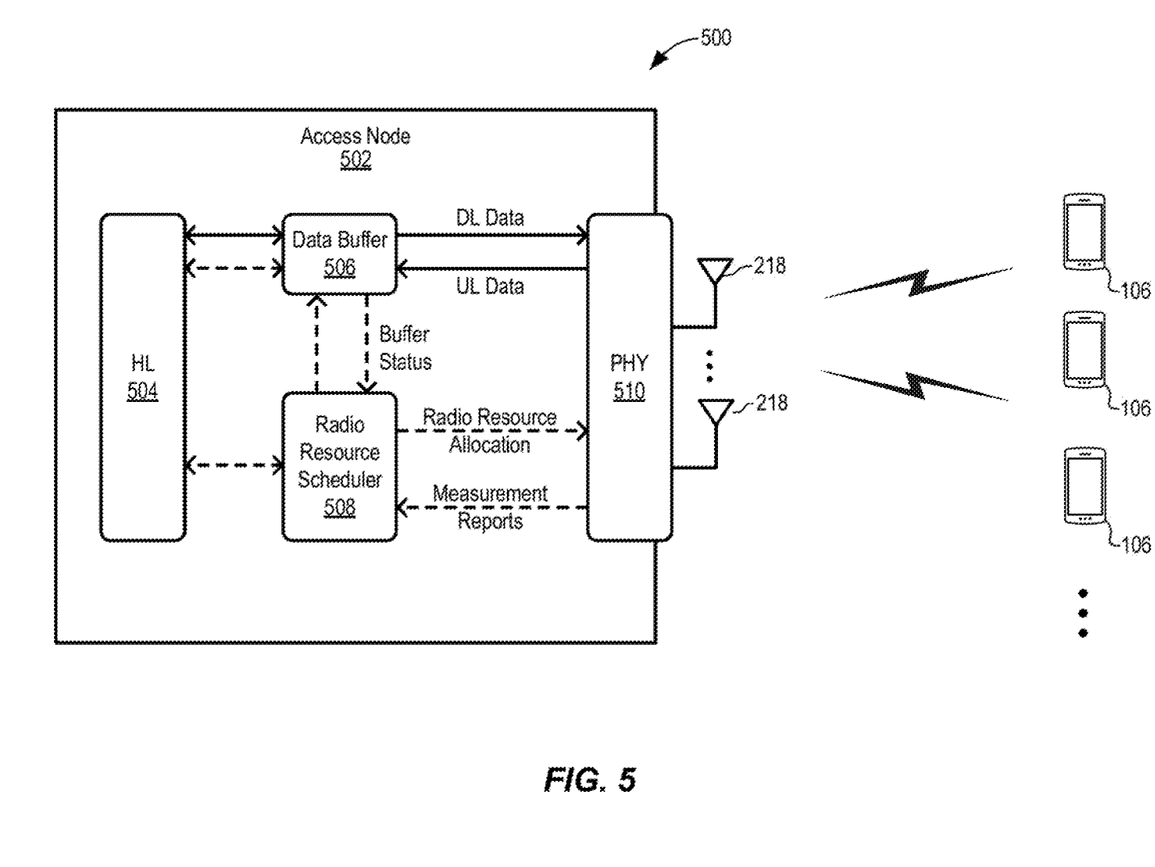
FIG. 5 is a block diagram schematically illustrating a representative communication system.

FIG. 5 is a block diagram illustrating an example communication system 500 in LTE 4G and NR 5G. The illustrated example communication system 500 includes an Access Node 502 and UEs 106. The Access Node 502 may be implemented as a computing device 202 or an application 220 executing in a computing device 202 or a virtual machine 310 or container 311. In the illustrated example, the Access node 502 includes higher layers 504, one or more data buffe4rs 506, a radio resources scheduler 508 and a physical layer 510 which includes one or more antennas 218. The Higher Layers (HL) 504 send and receive data and control signaling to and from lower layers of the protocol stack, and in particular the data buffer(s) 506 and radio resource scheduler 508. The data buffers 506 store downlink data being transmitted to the UEs 106, and also uplink data received from the UEs 106. The radio resource scheduler 508 allocates radio resources to each UE. According to the allocation results, the data buffer 506 forwards downlink data to the physical layer (PHY) 510, which transmits the downlink data to the appropriate UE 106. The PHY 510 also measures various channel parameters and reports measurement results to the scheduler 508 for use as input arguments to scheduling algorithms.

In practical networks, many UEs require only small data packets. For example, in a network in which a large number of UEs (such as Internet of Things, IoT, devices) that only require small data packets, such as the likelihood of un-scheduled PRBs at any given time is relatively high.

Systems and methods are disclosed herein that exploit partial scheduling of PRBs to pre-emptively suppress inter-cell interference (ICI). If desired, conventional techniques may also be used to mitigate any residual ICI, but in such cases the performance requirements of the conventional techniques can be relaxed because the amount of ICI that remains to be mitigated is reduced by the operation of the methods disclosed herein.

Figure 6:
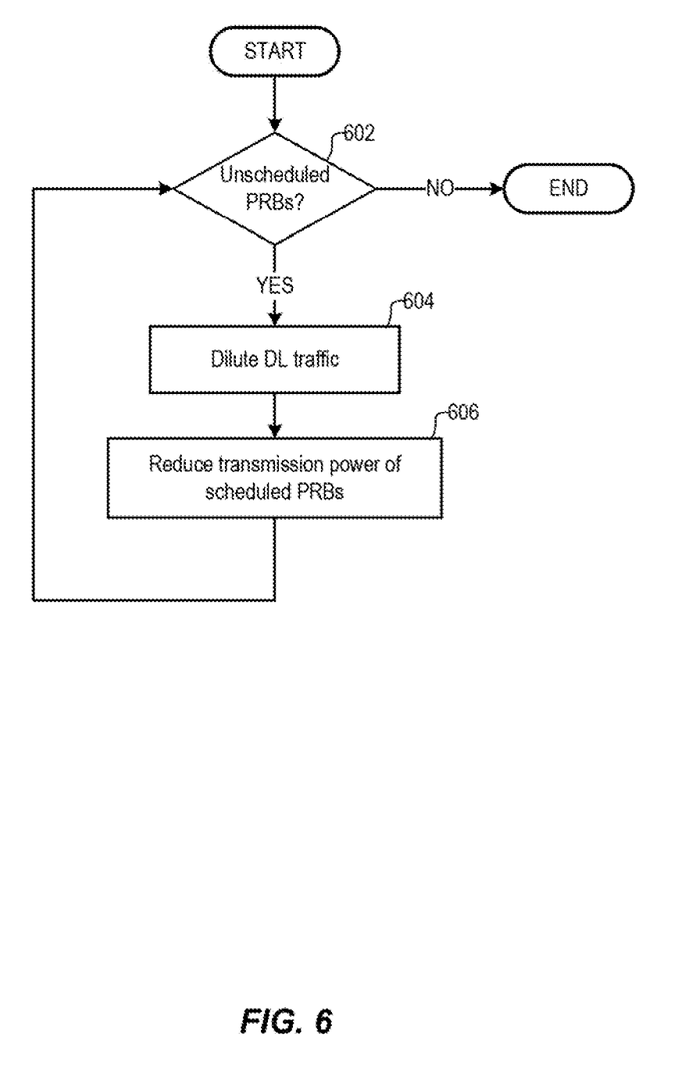
FIG. 6 is a flowchart illustrating an example process in accordance with representative embodiments of the present invention.

Referring to the flow-chart of FIG. 6, in very general terms, when the system PRBs are partially scheduled (at 602) (or, equivalently, at least some PRBs are not scheduled for data traffic), ICI can be pre-emptively suppressed by diluting (at 604) downlink data traffic flows over one or more of the un-scheduled PRBs, and reducing (at 606) the transmission power of the scheduled PRBs. This approach reduces the power spectral density (PSD) of physical downlink shared channel (PDSCH) transmissions from the access node, which in turn reduces ICI in neighboring cells. In addition, dilution of downlink data traffic flows increases frequency diversity, which in turn improves decoding robustness against ICI from neighboring cells. An advantage of this approach is that it does not rely on measured ICI.

Rather, ICI is pre-emptively suppressed based on the data traffic demand of each UE at any particular time and the physical characteristics of each wireless link.

In order to better understand aspects of the present disclosure, it is useful to consider the Shannon formula.

$$r = B \log_2(1+pg)$$

where r: is the information bit rate (or data rate) achieved in a given PRB; B is the bandwidth of the PRB; p is the transmission power; and g is the channel gain to noise ratio. This formula can be rearranged as:

$$p = (2^{r/B} - 1)/g.$$

from which it can be seen that the power is an exponential function in the rate. Thus, for two different data rates, $r_1$ and $r_2$, the corresponding transmission powers $p_1$ and $p_2$ will be:

$$p_1 = (2^{r_1/B} - 1)/g$$

$$p_2 = (2^{r_2/B} - 1)/g.$$

For an incremental increase in data rate $\Delta$, the corresponding transmission powers $p'_1$ and $p'_2$ will be:

$$p'_1 = (2^{(r_1+\Delta)/B} - 1)/g$$

$$p'_2 = (2^{(r_2+\Delta)/B} - 1)/g.$$

For the case where $r_1 < r_2$, then it can be seen that $$p'_1 - p_1 < p'_2 - p_2$$

This means that for a given data rate increment $\Delta$, a larger power increase is required for a higher base rate r. Put another way, for a given total data rate between the access node 502 and a UE 106, a lower total transmission power is achieved by scheduling a larger number of lower-power PRBs than by using a smaller number of higher-power PRBs. This means that when the channel quality is symmetric for a UE, it is beneficial to employ more PRBs instead of more power in each PRB to achieve a given data rate.

Accordingly, it is possible to reduce the transmission power of each PRB scheduled for a given UE, by minimizing the data rate in each scheduled PRB. When the traffic to/from the UE in question is diluted across previously un-scheduled PRBs, the data rate in each PRB scheduled for the UE can be reduced by reducing the modulation and coding scheme (MCS) associated with that UE. Furthermore, the benefits of this approach can be maximized by concentrating on the UE(s) with the highest base MCS values.

Figure 7:
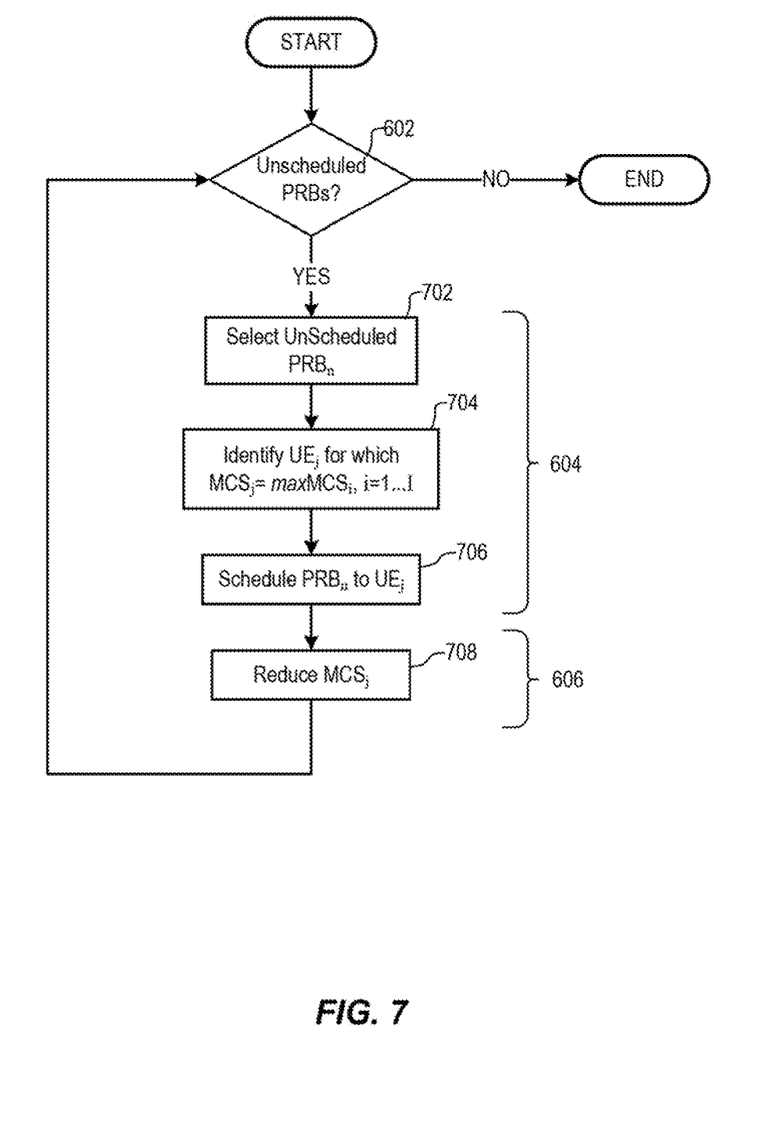
FIG. 7 is a flowchart illustrating an example process in accordance with a second representative embodiments of the present invention.

FIG. 7 is a flow-chart illustrating an example embodiment in which an access node 502 transmits downlink traffic to a set of I (an integer) UEs 106 (each of which may be denoted as $UE_j$, j=1 . . . I) and initially at least one unscheduled PDSCH PRB. Referring to FIG. 7, the example method includes the following steps, which may be executing iteratively until the number of remaining unscheduled PRBs has been reduced to a desired value, such as zero, for example. The example method of FIG. 8 includes the following steps:

Step 1 (at 702): An unscheduled PRB is selected. In a case in which there is initially more than one unscheduled PRB, any desired method may be used to select one of the unscheduled PRBs in each iteration;
   Step 2 (at 704): The $UE_j$ having the highest MCS value among the set of I UEs 106 is identified. In a case in which two or more of the UEs 106 have an equal "highest" MCS value, any suitable method may be used to select one of those UEs for the remaining steps in each iteration;
   Step 3 (at 706): The selected PRB is scheduled for downlink traffic destined for the identified $UE_j$;

Step 4 (at 708): The MCS value associated with the $UE_j$ (which may be denoted as $MCS_j$) is reduced. various methods may be used to reduce the value of $MCS_j$. For example, 3GPP Technical Standard (TS) 36.213 V15.7.0 (2019-09) describes, at Section 7.1.7 methods of determining modulation order and transport block size determination. The approach set out in 36.213 V15.7.0 (2019-09) may be used to identify a new $MCS_j$ value based on the new number of PRBs scheduled to the $UE_j$.

Figure 8:
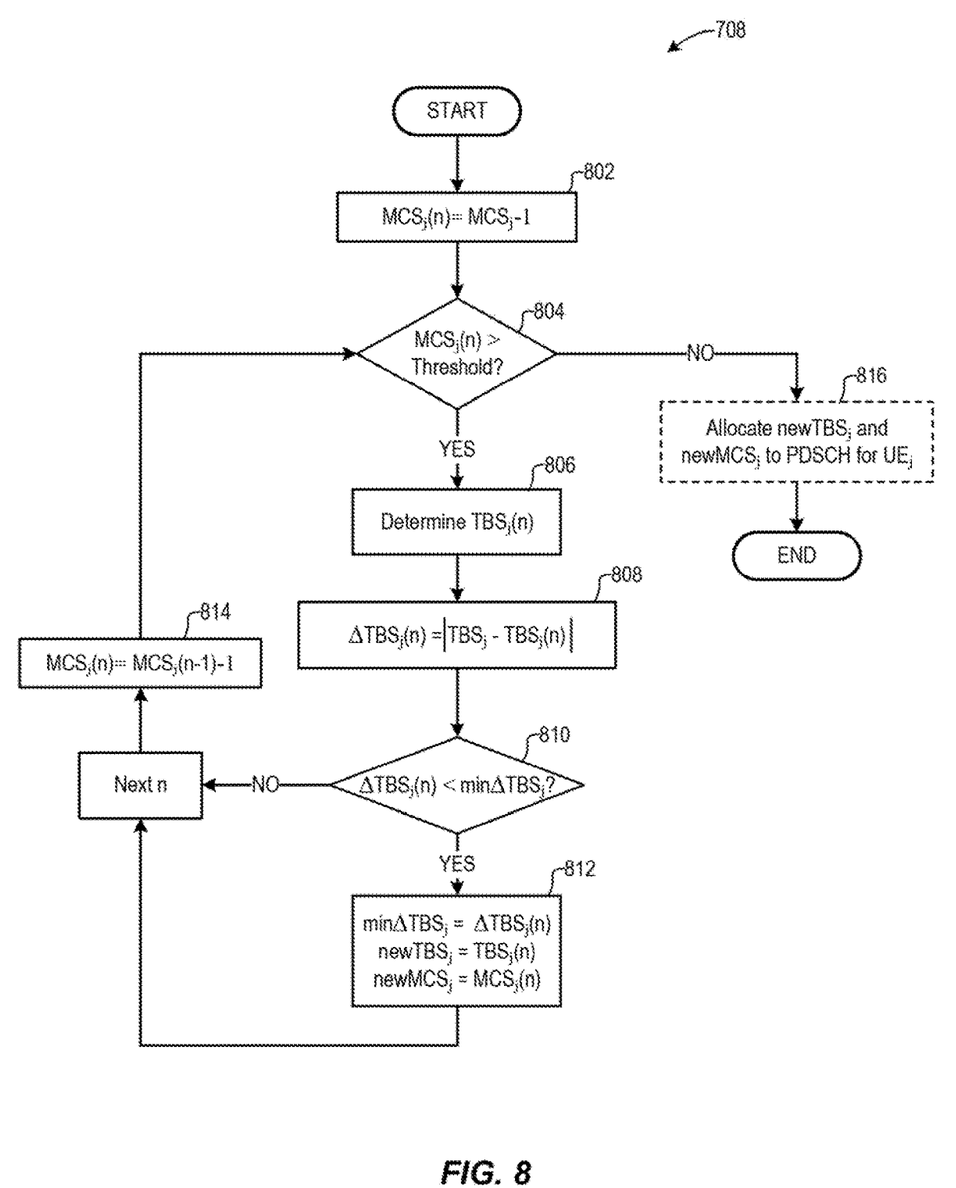
FIG. 8 is a flowchart illustrating an example process for reducing a modulation and coding scheme value.

For example, FIG. 8 illustrates an example iterative algorithm for determining a new MCS value for the $UE_j$, which may be denoted as $newMCS_j$. In the example of FIG. 8, the new MCS value ($newMCS_j$) is selected such that a change in the transport block size is minimized. This approach is beneficial in that it reduces changes in buffering requirements of downlink traffic destined for the $UE_j$. However, it will be appreciated that alternative algorithms for selecting $newMCS_j$ may be used, if desired. The example method of FIG. 8 includes the following steps:

Step 1 (at 802): an initial candidate MSC value, $MCS_j(n)$, is obtained by decrementing the current value of $MCS_j$.

Step 2 (at 804 and 806): If the candidate MSC value, $MCS_j(n)$, is equal to or less than the predetermined threshold, the process ends. Otherwise, a candidate TBS value is determined (as set out in Section 7.1.7 of 36.213 V15.7.0 (2019-09), for example), based on the candidate MSC value, $MCS_j(n)$, and the new number of PRBs scheduled for the $UE_j$. The candidate TBS value may be referend to as $TBS_j(n)$.

The predetermined threshold may be used to set a minimum permissible limit for the MSC assigned to the $UE_j$. For example, the threshold may be chosen based on maintaining an acceptable Signal to Interference plus Noise Ratio (SINR) or Block Error Rate (BLER) for the PDSCH.

Step 3 (at 808): The difference between the current TBS value, $TBS_j$, and the candidate TBS value, $TBS_j(n)$, is calculated. This difference may be denoted as $\Delta TBS_j(n)$.

Step 4 (at 810 and 812): If the difference value $\Delta TBS_j(n)$ is less than a previous lowest difference value, $min\Delta TBS_j(n)$, then the lowest difference value, $min\Delta TBS_j(n)$, is updated with the current difference value $\Delta TBS_j(n)$, and the new MCS and TBS values, $newMCS_j$ and $newTBS_j$ are updated with the candidate values $MCS_j(n)$ and $TBS_j(n)$, respectively.

If the difference value $\Delta TBS_j(n)$ is not less than the previous lowest difference value, $min\Delta TBS_j(n)$, then the process proceeds to step 5 (at 914) without updating $min\Delta TBS_j(n)$, $newMCS_j$ and $newTBS_j$.

Step 5 (at 814): The candidate MSC value, $MCS_j(n)$ is decremented for the next iteration, which begins at step 2 (at 804) above.

As noted above, the iterative process of FIG. 8 terminates when the candidate MSC value, $MCS_j(n)$ is below a predetermined threshold, which may, for example, reflect a minimum allowable SINR of the PDSCH. When this happens, the values $newMCS_j$ and $newTBS_j$ will respectively contain new MCS and TBS values that can be assigned to PDSCH for the selected $UE_j$ while minimizing any change in the TBS, and thus also minimizing any change to buffering of downlink traffic destined for the $UE_j$. Accordingly, the values $newMCS_j$ and $newTBS_j$ may be allocated (at 916) to the PDSCH for the selected $UE_j$.

Returning to FIG. 7, Once the new (reduced) value of MCS has been found (at 708, and FIG. 8), the process may return to step 702 for selection of a next unscheduled PRB, if any.

While processes in the figures may show a particular order of operations performed by certain embodiments of the present disclosure, it should be understood that such order is representative, and that alternative embodiments may perform the operations in a different order, combine certain operations, overlap certain operations, etc.

Those skilled in the art will recognize improvements and modifications to the embodiments of the present disclosure. All such improvements and modifications are considered within the scope of the concepts disclosed herein.

What is claimed is:

1. A method in an access node of a wireless communication network comprising bandwidth divided into a plurality of physical resource blocks, PRBs, the access node configured to transmit downlink traffic to a plurality of user equipments, UEs, in a coverage area of the access node, the method comprising:
   detecting at least one unscheduled PRB in the plurality of PRBs;
   diluting downlink traffic across the at least one unscheduled PRB by selecting one UE from the plurality of UEs and scheduling a selected one unscheduled PRB for downlink traffic destined for the selected UE; and
   reducing transmission power of scheduled PRBs in the plurality of PRBs by reducing a modulation and coding scheme, MCS, value allocated to the selected UE, reducing the MCS value allocated to the selected UE comprising:
      finding a new MCS value, based at least in part on a new number of PRBs scheduled for downlink traffic destined for the selected UE, such that a change in a transport block size (TBS) for downlink traffic destined for the selected UE is minimized; and
      allocating the new MCS value to the selected UE.

2. The method of claim 1, wherein selecting one UE from the plurality of UEs comprises selecting a UE having a highest MCS value among the plurality of UEs.

3. An access node of a wireless communication network comprising a bandwidth divided into a plurality of physical resource blocks, PRBs, the access node configured to transmit downlink traffic to a plurality of user equipments, UEs, in a coverage area of the access node, the access node comprising:
   at least one processor; and a memory storing computer readable software instructions configured to control the at least one processor to implement a method comprising steps of:
   detecting at least one unscheduled PRB in the plurality of PRBs;
   diluting downlink traffic across the at least one unscheduled PRB by selecting one UE from the plurality of UEs and scheduling a selected one unscheduled PRB for downlink traffic destined for the selected UE; and
   reducing transmission power of scheduled PRBs in the plurality of PRBs by reducing a modulation and coding scheme, MCS, value allocated to the selected UE, reducing the MCS value allocated to the selected UE comprising:
      finding a new MCS value, based at least in part on a new number of PRBs scheduled for downlink traffic destined for the selected UE, such that a change in a transport block size (TBS) for downlink traffic destined for the selected UE is minimized; and
      allocating the new MCS value to the selected UE.

4. A non-transitory computer-readable medium comprising computer readable software instructions configured to control at least one processor of an access node to implement a method, the access node being in a wireless communication network comprising bandwidth divided into a plurality of physical resource blocks, PRBs, the method comprising steps of:
- detecting at least one unscheduled PRB in the plurality of PRBs;
- diluting downlink traffic across the at least one unscheduled PRB by selecting one UE from the plurality of UEs and scheduling a selected one unscheduled PRB for downlink traffic destined for the selected UE; and
- reducing transmission power of scheduled PRBs in the plurality of PRBs by reducing a modulation and coding scheme, MCS, value allocated to the selected UE, reducing the MCS value allocated to the selected UE comprising:
  - finding a new MCS value, based at least in part on a new number of PRBs scheduled for downlink traffic destined for the selected UE, such that a change in a transport block size (TBS) for downlink traffic destined for the selected UE is minimized; and
- allocating the new MCS value to the selected UE.

* * * * *